United States Patent [19]

Jodar et al.

[11] Patent Number: 4,495,892

[45] Date of Patent: Jan. 29, 1985

[54] INCUBATOR FOR PIGLETS

[75] Inventors: Francisco Y. Jodar; Agustin A. Arcas, both of Lorca, Spain

[73] Assignee: D. Agustin Amador Arcas Y Nipor S.A., Lorca, Spain

[21] Appl. No.: 456,755

[22] Filed: Jan. 10, 1983

[30] Foreign Application Priority Data

Oct. 29, 1981 [ES] Spain ..................................... 261.111

[51] Int. Cl.³ .......................... A01K 1/00; A01K 1/02
[52] U.S. Cl. ........................................ 119/16; 119/33; 119/20
[58] Field of Search ........................ 119/31, 33, 16, 20

[56] References Cited

U.S. PATENT DOCUMENTS

| 2,070,482 | 2/1937 | Hawkins | 119/33 |
| 2,280,779 | 4/1942 | Barragy | 119/33 |
| 2,281,776 | 5/1942 | Lyon | 119/33 |
| 2,627,841 | 2/1953 | Johnson | 119/31 |
| 3,995,592 | 12/1976 | Goldstaub et al. | 119/33 |

Primary Examiner—Hugh R. Chamblee
Attorney, Agent, or Firm—Michael J. Striker

[57] ABSTRACT

Pig incubator includes a container formed of a substantially rectangular housing with an interchangeable floor plate and a curved cover in the upper section of which an insert is provided which extends into the interior of the cover and carries a heating element, a light and a control thermostat. The insert is separated from the interior of the housing by an insulation grill preventing contact of the piglets placed in the incubator with the heating element.

14 Claims, 7 Drawing Figures

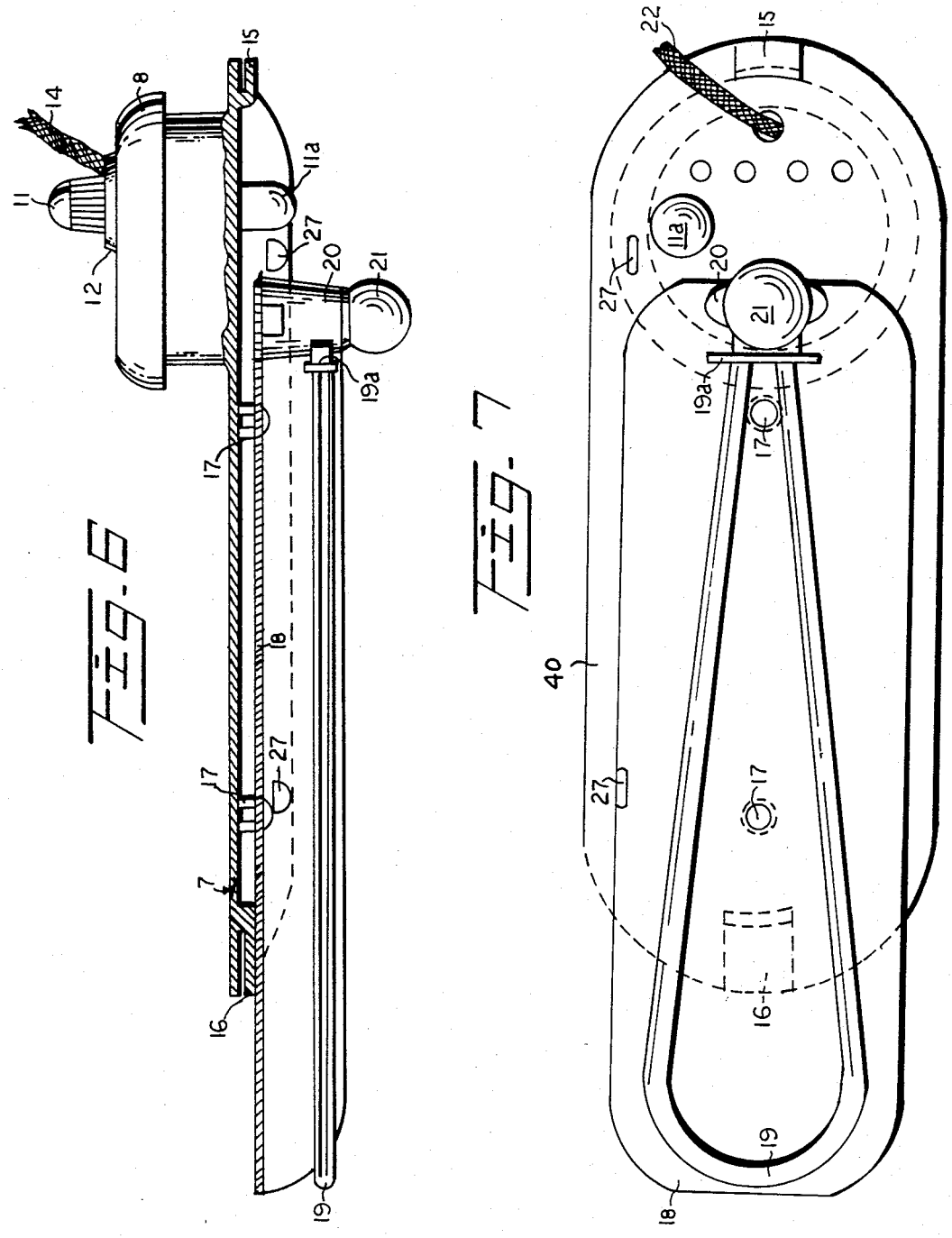

INCUBATOR FOR PIGLETS

BACKGROUND OF THE INVENTION

The present invention relates to an incubator for piglets.

The need is well known for piglets in the first stage of life, during the suckling period and when separated from the mother, to be sheltered in a suitable place having a given temperature, in order to achieve greater effectiveness in their development.

Usually, stoves, lamps, electric screens and other similar heat-radiating apparatus have been used to provide for the necessary conditions for piglets. However, conventional heating means have been found unsuccessful in bringing the piglets to the heat source and grouping them around it because the piglets often leave the radius of action of such a heating apparatus much to the ditriment of the animals.

SUMMARY OF THE INVENTION

It is an object of the present invention to provide an incubator for piglets which avoids the disadvantages of conventional devices of the type under consideration.

It is a further object of the invention to provide an improved incubator for piglets.

These and other objects of the invention are attained by a pig incubator, comprising a container for holding piglets therein, said container including a housing and a cover carrying at least one heating element mounted on an inner side thereof such that the piglets which enter the container are situated under the heating element; and insulation means including a grill mounted in the cover at a predetermined height level and extended in the container to separate the piglets from the heating element.

The container further includes a floor plate at the bottom of the housing. In accordance with further features of the invention the incubator may include a temperature control means, an emergency heating element, and a light, said temperature control means, said emergency heating element and said light being accommodated in said cover, said light functioning as a lure for grouping the piglets under the heating element.

The temperature control means may include a thermostat located outside said cover and a pilot light mounted on the thermostat for indicating that the heating element is in operation.

The housing may have a substantially rectangular cross-section.

According to a further feature of the invention the cover has a base of a rectangular cross-section, said base being connected to said housing, and a peripheral surface having a front side and a back side, the front side and back side being symmetrically curved.

The cover may have a top provided with a central slit-like opening.

The incubator according to the invention may be further provided with an insert mounted in said opening.

The insert may include two superimposed metal plates vertically spaced from each other, the lower one of said plates being a reflecting plate, said thermostat being mounted on the upper one of said plates, the heating element being mounted on the reflecting plate.

The incubator may further include ventilation means on said cover, said ventilation means including a grill formed on the back side of the peripheral surface of said cover.

Accordingly, characteristic features of the invention are as follows:

The container according to the invention is able to always hold the piglets, that are to enter same, under the heating elements, which are located inside said container and separated from the piglets by insulation and safety means.

A light point which is to be situated at the top or roof of the container is intended to have the piglets group themselves around it.

A heat source derived from electric power or, alternatively, butane gas or hot water obtained by any process, including solar energy, is situated at the top or roof of the container and suitably insulated from the piglets.

A thermostat that regulates the intensity of the heat is provided in the incubator.

An electric emergency device for maintaining the desired temperature inside the container, independent of the main heating arrangement is provided.

The arrangement of all the functional elements is made inside the cover of the container, which cover is equipped with the insulation of those elements, so that the piglets cannot come in direct contact with the functional elements.

A ventilation device suitably arranged to purify the atmosphere inside the container or incubator is further provided.

The center part of the container delimiting the side walls and front wall of same has the rectangular shape which must correspond to the base of the cover. The entrance for the piglets is set up on one of the front walls at floor level, at the proper height, such entrance having to carry on its vertical edges a device making possible the vertical slide of an additional cover which closes the access into the container, when necessary.

The floor of the container or incubator is composed of an interchangeable sliding plate, in order to remove it from its housing.

The material to be used in construction of the incubator is, preferably sheet metal or any other suitable malleable material.

The incubator according to the invention is comprised of three parts, one of which is the top or cover, which at the same time is used to accommodate the elements making it possible to obtain the heating effects within the container, the regulation of the temperature, and the positioning of the standby or emergency heating element and the light point which serves as a lure for grouping the piglets under the heating point, the cover further accommodating on the outside the thermostat control and the pilot light indicating that the heating device of the incubator is in operation.

The container or housing is another part of the unit, the cover may be lowered into the housing to provide easy access into the incubator from above. The third part of the incubator is a floor which may be provided with a slidable grate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 6 is a side view of the upper part of the incubator, on enlarged scale; and FIG. 7 is a top plan view of the upper part of the incubator shown in FIG. 6 and also on enlarged scale.

DETAILED DESCRIPTION OF THE PREFERRED EMBODIMENTS

Figure 1:
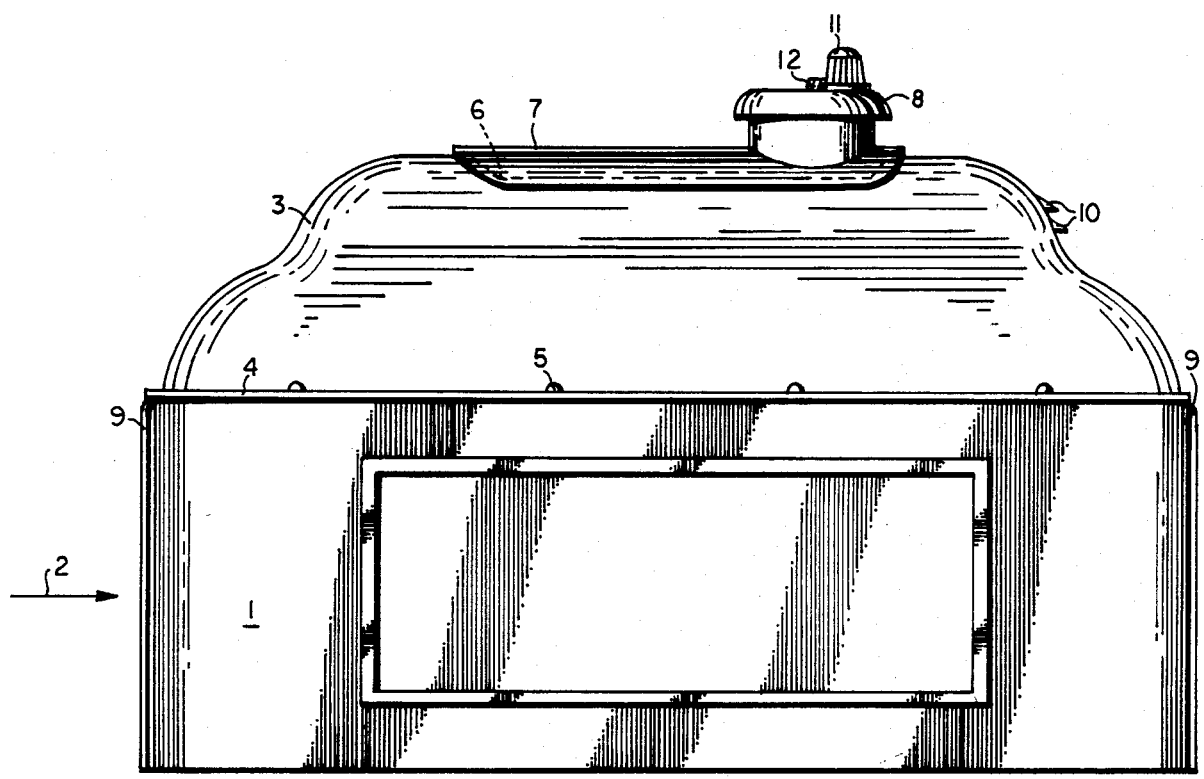
FIG. 1 is a side elevational view of a pig incubator according to the invention.
Figure 2:
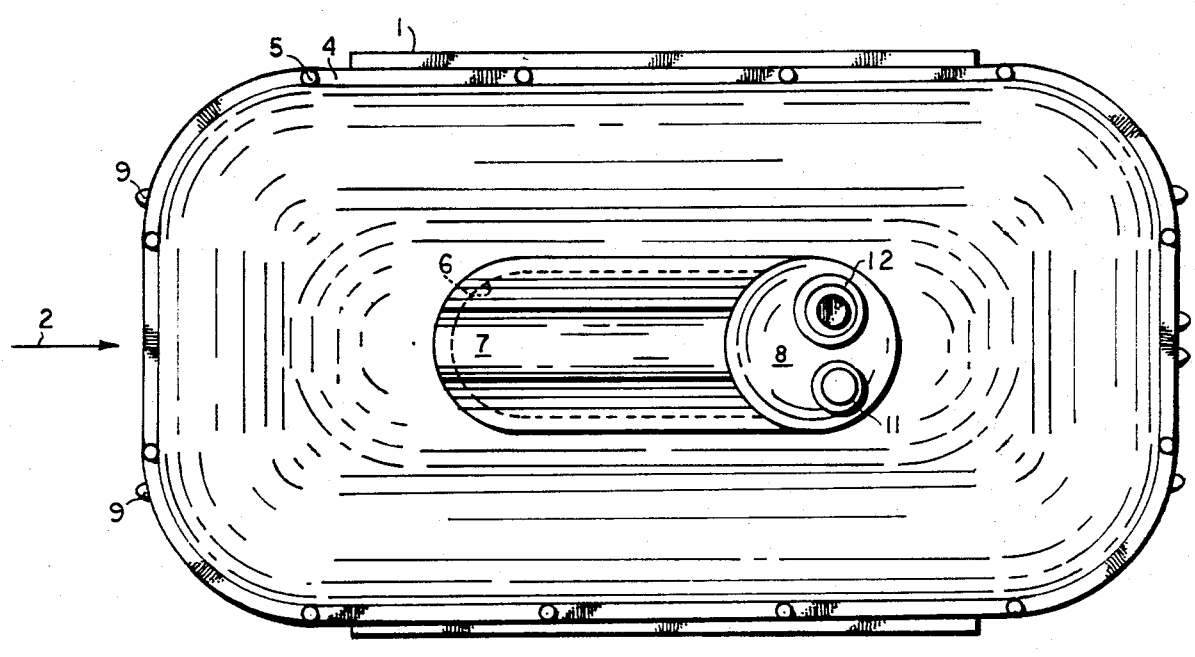
FIG. 2 is a top plan view of the incubator of FIG. 1.

Referring now to the drawings, and first to FIGS. 1 and 2 thereof, it will be seen that the incubator includes a first central housing part which is identified by a reference character 1 and is a substantially rectangular hollow body with four corners rounded off. Reference numeral 2 denotes an arrow indicating the entrance through which the piglets or other animals are passed. It should be noted that the entrance side wall of the housing body 1 is provided with lateral grooves (not shown) to receive a vertical sliding cover (not shown) to let the piglets into the incubator. Reference character 2a shows the interior of the incubator.

A second part of the incubator housing is a top or cover 3 situated over the central rectangular housing body 1. Cover 3 is provided at an inner surface thereof with a lining made out of, for example polyurethane. Cover 3 has a bottom base periphery of a rectangular cross-section to match the housing body 1, to which it is connected, and a peripheral surface extending upwardly from the base periphery of the cover. The peripheral surface of the cover 3 is defined by a substantially flat upper surface and by curved symmetrical side surfaces. These side surfaces are formed with pronounced cambers on the upper front and rear parts of the cover. A slit-like opening 6 is formed in the upper surface of the cover 3 in which a supporting insert or lid 7 bearing a thermostat 8 and other functional elements is inserted.

The cover 3 at the base periphery thereof can be fastened to the top of the central housing part 1 or to an edge 4 thereof by any suitable means, for example by rivets 5. The cover 3 may be lowered sideways to facilitate access to the central part 1.

As seen in the drawings the housing of thermostat 8 is mounted on the lid 7. Reference character 11 designates an outside pilot light which indicates that the heating device of the incubator is in operation. A control 12 for regulating the thermostat 8 is arranged on the top of the thermostat. The central housing part 1 is formed with reinforcement ribs 9. The cover 3 in turn is formed with a grill or groove 10 provided at the back side of the cover for ventilation of the incubator.

It is to be noted that similar reference numerals are applied to the similar elements in all the figures of the drawings. In FIG. 2 the position of the lid 7 split at the opening 6 of cover 3 is seen.

Figure 3:
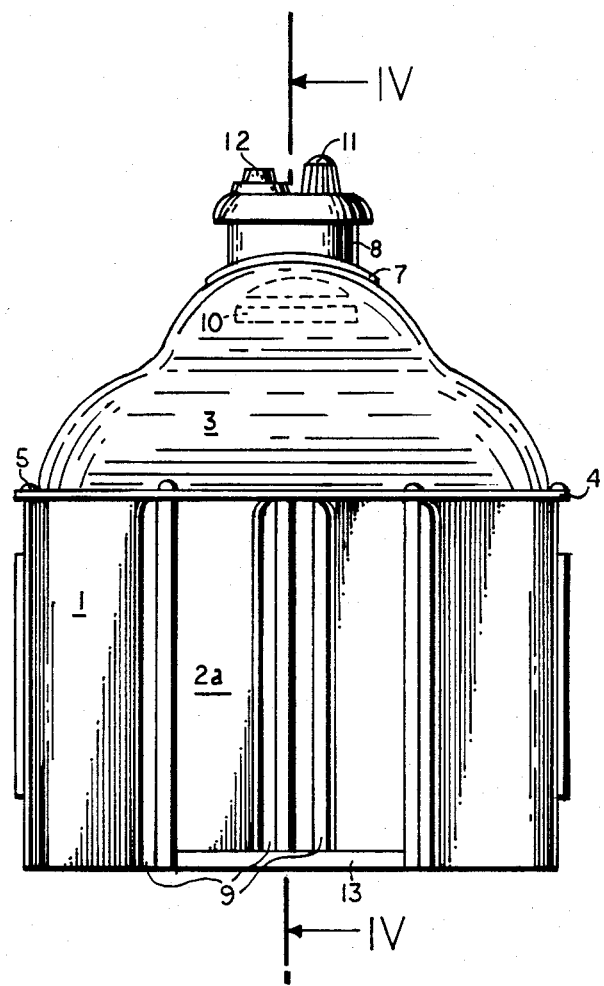
FIG. 3 is a front elevational view of the incubator of FIG. 1.
Figure 4:
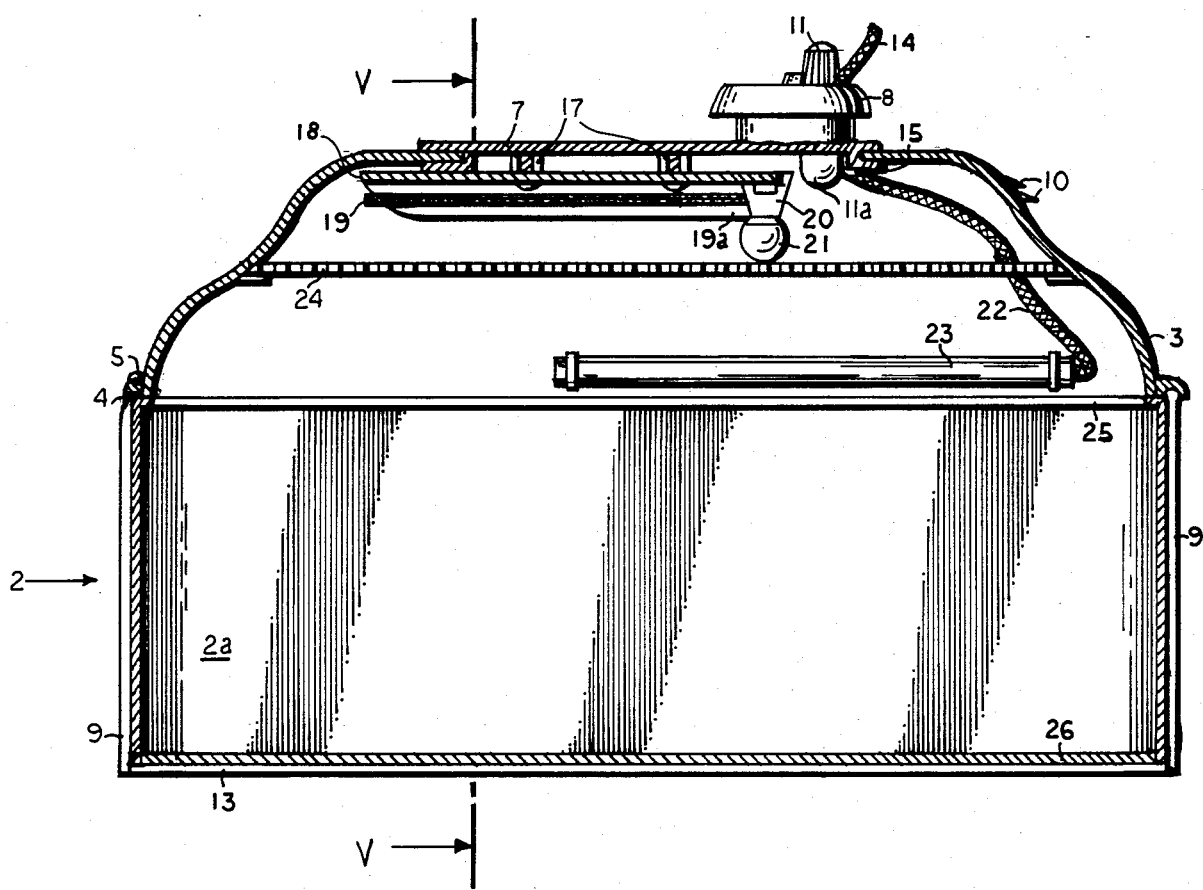
FIG. 4 is a sectional view along line IV—IV of FIG. 3.
Figure 5:
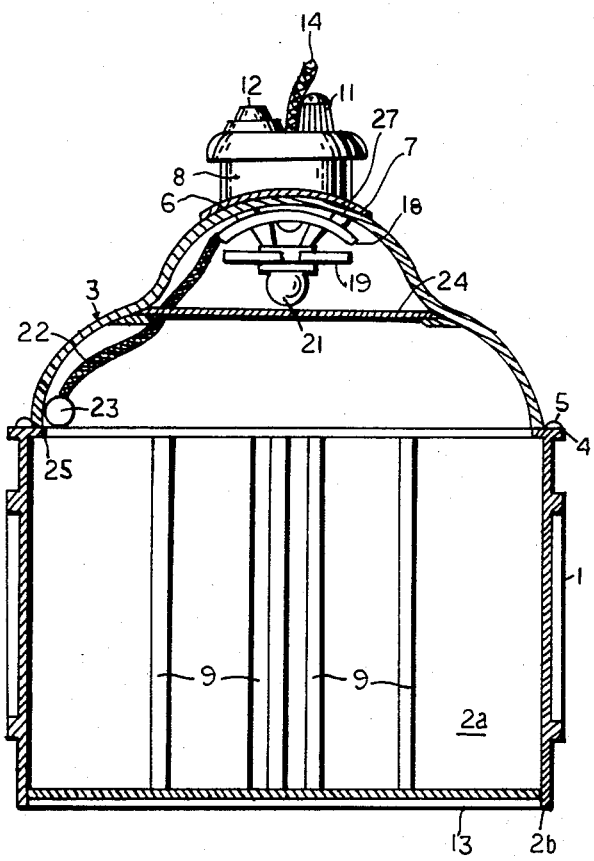
FIG. 5 is a sectional view along line V—V of FIG. 4.

FIG. 3 illustrates the front view of the incubator which is provided with an interchangeable floor 13 which closes the central body part 1 at the bottom thereof. Floor 13 which constitutes the third part of the housing body has a grate on its upper face which can be slidably moved out from the incubator for cleaning.

Referring now to FIGS. 4-7 which illustrate functional elements mounted on the cover 3 in detail it will be seen that insert or lid 7 is composed of an upper metal plate 40 and a lower reflecting plate 18 spaced from plate 40 and connected thereto by any conventional fastening means extending into projections 17 formed on plate 40. Plate 40 is provided with two opposite flanges 15 and 16 which abut against the upper surface of the reflecting plate 18. A heating element of the incubator mounted on the lid 7 includes a resistor 19 terminated with a plug 19 integral therewith, which plug fits into a lamp socket 20. Socket 20 is mounted to the reflecting plate 18. A cable 14 supplies electric power to the heating element and to a light 11a from a power supply source.

An infrared ray bulb 21 inserted into the lamp socket 20 represents an additional heating element which may be used in the case of interruption of the power supply to the heating resistor. A cable 22 is provided in the incubator to connect the thermostat 8 with its tube 23 extended within the interior of cover 3. Below the heating resistor 19 a grill 24 is mounted in the cover 3, which grill extends lengthwise of the cover from its front side to its rear side and transversally from one side of the housing to the opposite side thereof so as to separate the interior 2a of the incubator from the functional elements mounted in the upper part of cover 3, grill 24 installed at the predetermined level serving the purpose of protection of the piglets placed in the incubator against coming to contact with those functional elements.

It should be noted that gas source or hot water heating element can replace the electrical heating element described herein. Furthermore, solar heating element can be employed in the present invention. It would be sufficient for substitution of the electrically supplied heating element by any other heating element to vary the access of suitable energy sources through the placement and substitution of heat screens and heating tubes in the reflecting plate 18.

The operation of the incubator provided with functional elements according to the invention is as follows:

Once the lamp 21 placed inside the incubator is lit it attracts the piglets which group themselves underneath it after they have been placed into the container, and at the same time the heating element located on the reflecting plate 18 gives heat to those piglets, the desired constant temperature being maintained by means of the control thermostat 8 and therefore the animals are sheltered in the incubator there by virtue of finding a favorable environment. If necessary, the entrance into the incubator can be closed off by the sliding cover (not shown).

It will be understood that each of the elements described above, or two or more together, may also find a useful application in other types of pig incubators differing from the types described above.

While the invention has been illustrated and described as embodied in a pig incubator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pig incubator, comprising a container for holding piglets therein, said container including a housing of a substantially rectangular cross-section, a cover carrying at least one heating element mounted on an inner side thereof such that the piglets which enter the container are situated under the heating element, and a floor plate at the bottom of said housing; a temperature control means; an emergency heating element; a light, said temperature control means, said emergency heating element and said light being accommodated in said cover, said light functioning as a lure for grouping the piglets under the heating element, said temperature control means including a thermostat located outside said cover and a pilot light mounted on said thermostat for indicating that the heating element is in operation, said cover having a base of a rectangular cross-section and a peripheral surface having a front side and a back side, said base being connected to said housing, said front side and back side being symmetrically curved, said cover having a top provided with a central slit-like opening; and an insert mounted in said slit-like opening, said insert including two superimposed metal plates vertically spaced from each other, a lower one of said plates being a reflecting plate, said thermostat being mounted on an upper one of said plates, said heating element being mounted on said reflecting plate.

2. The incubator as defined in claim 1, further including ventilation means on said cover, said ventilation means including a grill formed on the back side of the peripheral surface of said cover.

3. The incubator as defined in claim 1, said cover having an interior surface covered with a lining.

4. The incubator as defined in claim 3, said lining being formed of polyurethane.

5. The incubator as defined in claim 1, wherein said emergency heating element is an infrared lamp mounted on said reflecting plate.

6. The incubator as defined in claim 5, wherein said housing has rounded corners.

7. The incubator as defined in claim 6, wherein said housing is provided with reinforcing ribs.

8. The incubator as defined in claim 7, said housing having a front wall defining an entrance of the container, a back wall and two opposite lateral walls, all said walls being provided with reinforcing ribs.

9. The incubator as defined in claim 8, wherein the reinforcing ribs provided on said front wall and said back wall extend along the entire height of said housing whereas the reinforcing ribs provided on said lateral walls have a lesser height that those on said front and back walls.

10. The incubator as defined in claim 9, wherein said cover is partially inserted into said housing to be connected therewith.

11. The incubator as defined in claim 9, wherein said floor plate is slidable into and out from said housing through said front wall.

12. The incubator as defined in claim 11, wherein said floor plate has a rectangular cross-section matching to that of said housing.

13. The incubator is defined in claim 12, wherein said floor plate is interchangeable.

14. The incubator as defined in claim 13, wherein said floor plate is made out of plank of wood of absorbent quality.

* * * * *